United States Patent [19]
Frederiksen

[11] Patent Number: 5,619,818
[45] Date of Patent: Apr. 15, 1997

[54] FLY TIER'S STACK AND CLAMP TOOL

[76] Inventor: Dellas Frederiksen, 5413 Capson Ave., Boise, Id. 83704

[21] Appl. No.: 520,162

[22] Filed: Aug. 28, 1995

[51] Int. Cl.⁶ ................................................ A01K 97/26
[52] U.S. Cl. .................... 43/4; 43/1; 7/106; 269/254 R
[58] Field of Search .................... 43/1, 4; 7/106; 269/254 R

[56] References Cited

U.S. PATENT DOCUMENTS

| | | | |
|---|---|---|---|
| 2,166,585 | 7/1939 | Evans | 43/1 |
| 2,236,781 | 4/1941 | Pannier | 43/1 |
| 3,060,613 | 10/1962 | Murray | 43/1 |
| 4,660,314 | 4/1987 | Janssen et al. | 43/4 |
| 4,796,372 | 1/1989 | Klein | 43/4 |
| 5,230,177 | 7/1993 | Hanley | 43/1 |

*Primary Examiner*—Jeanne M. Elpel
*Assistant Examiner*—Jay A. Stelacone
*Attorney, Agent, or Firm*—Allen A. Dicke, Jr.

[57] ABSTRACT

A body tube is plugged at one end so as to receive hair and stack the hair against that end. Two gathering slides have tapered holes and move opposite each other crosswise of the body tube to gather the hair. A clamp tube lies against the body tube and holds clamp jaws away from the hair until the clamp tube is withdrawn. Hair is quickly stacked and clamped for use in tying fishing flies.

21 Claims, 4 Drawing Sheets

FLY TIER'S STACK AND CLAMP TOOL

FIELD OF THE INVENTION

This invention is directed to a tool which helps handle, position and clamp hair and other fibers for use in tieing fishing flies.

BACKGROUND OF THE INVENTION

The fishing for trout has a wide following of aficionados. Trout fishing is principally accomplished with lures in the form of artificial flies which are made up to resemble natural trout food. Why a selectively feeding trout happens to accept or reject a particular fly is a mystery of trout fishing. The question has been studied by anglers for centuries and by laboratory scientists for decades. A few partial answers have been developed. One large question about which many anglers wonder is how a trout can be sometimes so fussy over the body color of a particular dry fly while apparently ignoring the large and blatantly obvious hook extending from the rear of the fly. This question is unresolved. Fly tiers attempt to relate the color and configuration of a fly to the natural insects which are the food of many of the trout. However, while simple in logic, the creation by tieing of artificial flies which closely resemble the natural food is not the answer to all questions. The basic answer to a successful artificial fly is that the trout likes it.

The fly tier is searching for an artificial fly which will cause the trout to rise. As noted above, it is not necessarily a question of resembling natural food, but one that is attractive to the trout. It is also interesting to find that different artificial flies work best on different trout streams. For this reason, it is desirable to tie your own fly so that you can create an artificial fly which is attractive to the trout in your stream.

SUMMARY OF THE INVENTION

In order to aid in the understanding of this invention, it can be stated in essentially summary form that it is directed to a fly tier's stack and clamp tool which has a tube with a closed bottom therein. Selected hair is placed in the stack tube. The tool is tapped to bring the bottom ends of the hairs into alignment. Thereupon, the hairs are bunched by pressing gathering slides from opposite sides. Next, the tool is pulled apart so that clamp jaws are released to engage on the hair. As the clamp tube is pulled away, the hair is constrained therewith in the clamp jaws for tieing onto a hook to create a fly.

It is, thus, a purpose and advantage of this invention to provide a tool which can stack hair and other fibers to be used in the tieing of an artificial fly and after stacking, the hair is bunched or gathered and thereupon clamped so that the clamped hair is available for fly tieing.

It is another purpose and advantage of this invention to provide a fly tier's stack and clamp tool which can alternatively clamp the hair near the tips with the butt ends out or clamp the hair on the shank with the hair tips extending out of the clamp so that either end of the hair is available for tieing.

It is a further purpose and advantage of this invention to provide a fly tier's stack and clamp tool which is a single device which first stacks the hair even on one end, thereupon gathers the hair into a small bundle and, finally clamps the hair. The clamp is removed from the balance of the tool so that the even end of the hair, either the butt or tip ends, are exposed for tieing into an artificial fly.

It is another purpose and advantage of this invention to provide a fly tier's stack and clamp tool which is faster than a conventional hair stacker and which, in addition, provides clamp fingers which hold the hair in place during removal from the stack and clamp tool to the vise which holds the hook to which the hair is to be tied. The clamp holds the hair in place more securely than the conventionally used fingers.

Other objects and advantages of this invention will become apparent from a study of the following portion of the specification, the claims and the attached drawings.

DESCRIPTION OF THE PREFERRED EMBODIMENT

Figure 4:
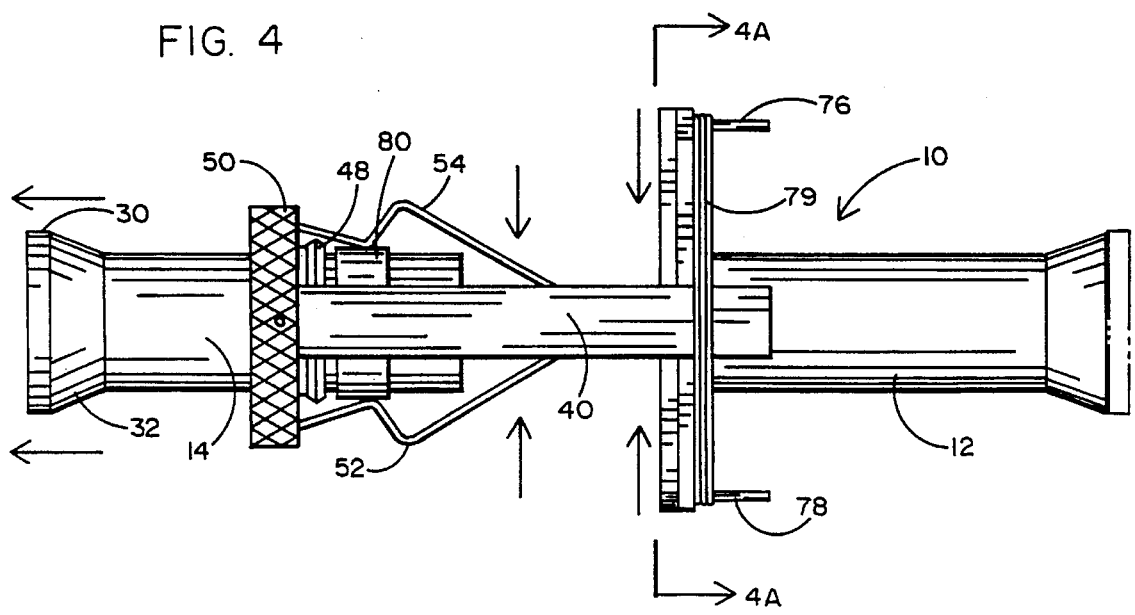
FIG. 4 is a view similar to FIG. 3, showing the fly tier's stack and clamp tool in the position where the clamp tube is being moved and the jaws clamp the hair.
Figure 5:
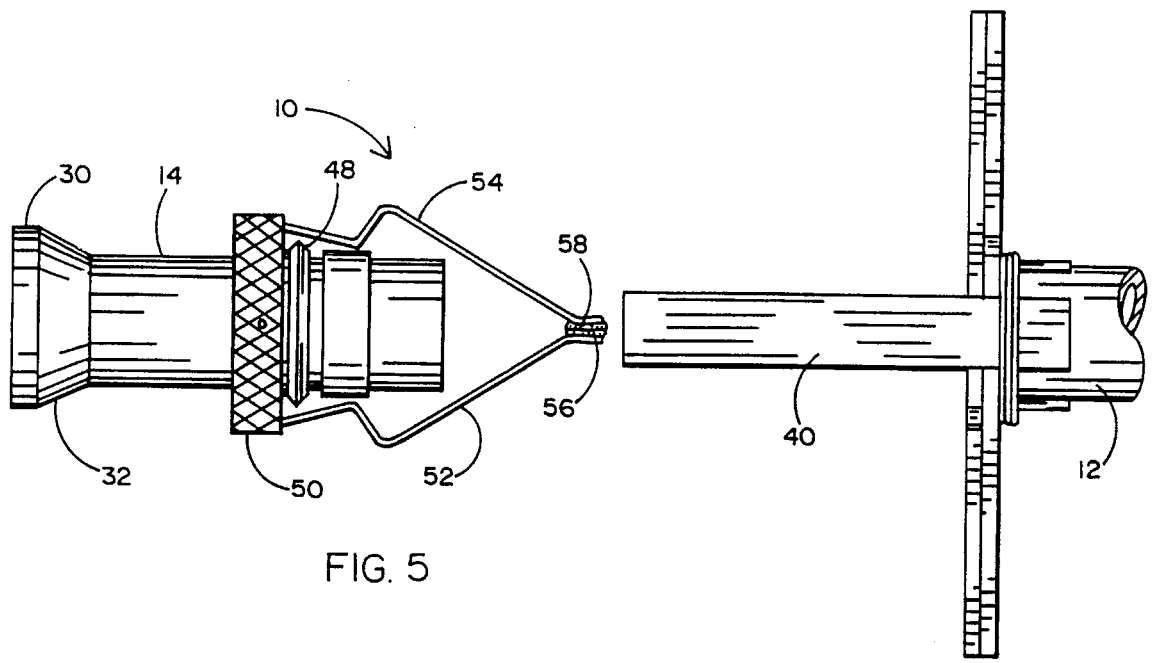
FIG. 5 is similar to FIG. 4, showing the clamp tube fully removed from the body tube for removal of clamped hairs.
Figure 6:
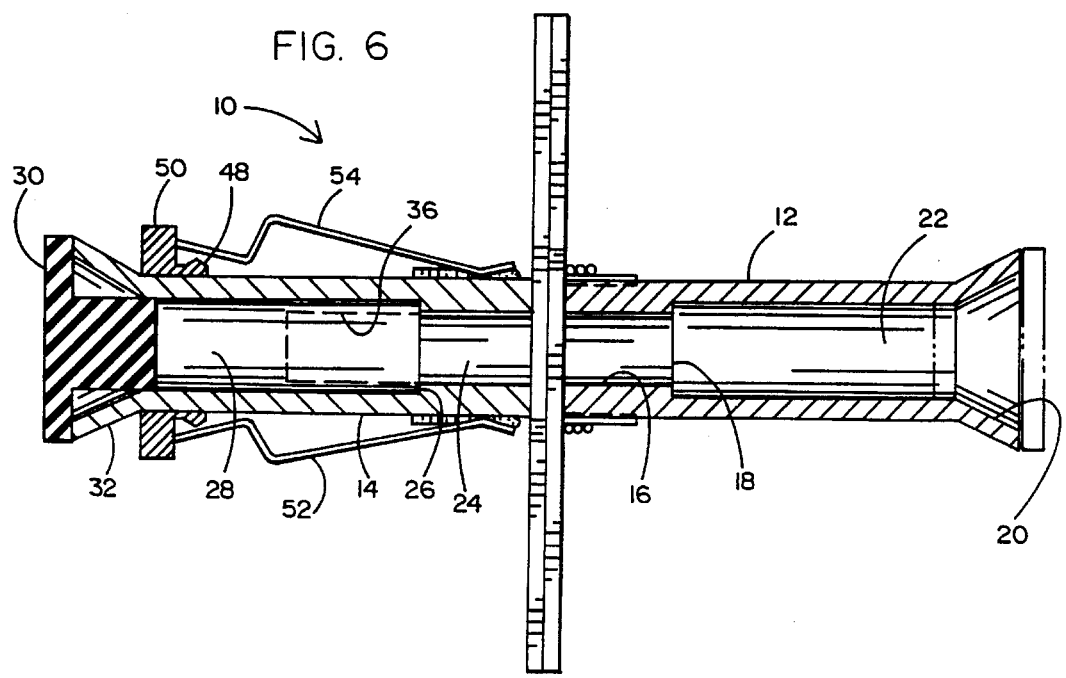
FIG. 6 is a view similar to FIG. 3, but generally taken the longitudinal center line.

The fly tier's stack and clamp tool is generally indicated at 10 in FIGS. 1, 2, 3, 4, 5 and 6. It comprises a body tube 12 and clamp tube 14. As best seen in FIG. 6, body tube 12 has a bore 16 therethrough, with a shoulder 18 facing the open right end of the tube. The open right end may be funnel-shaped with funnel opening 20.

Figure 2:
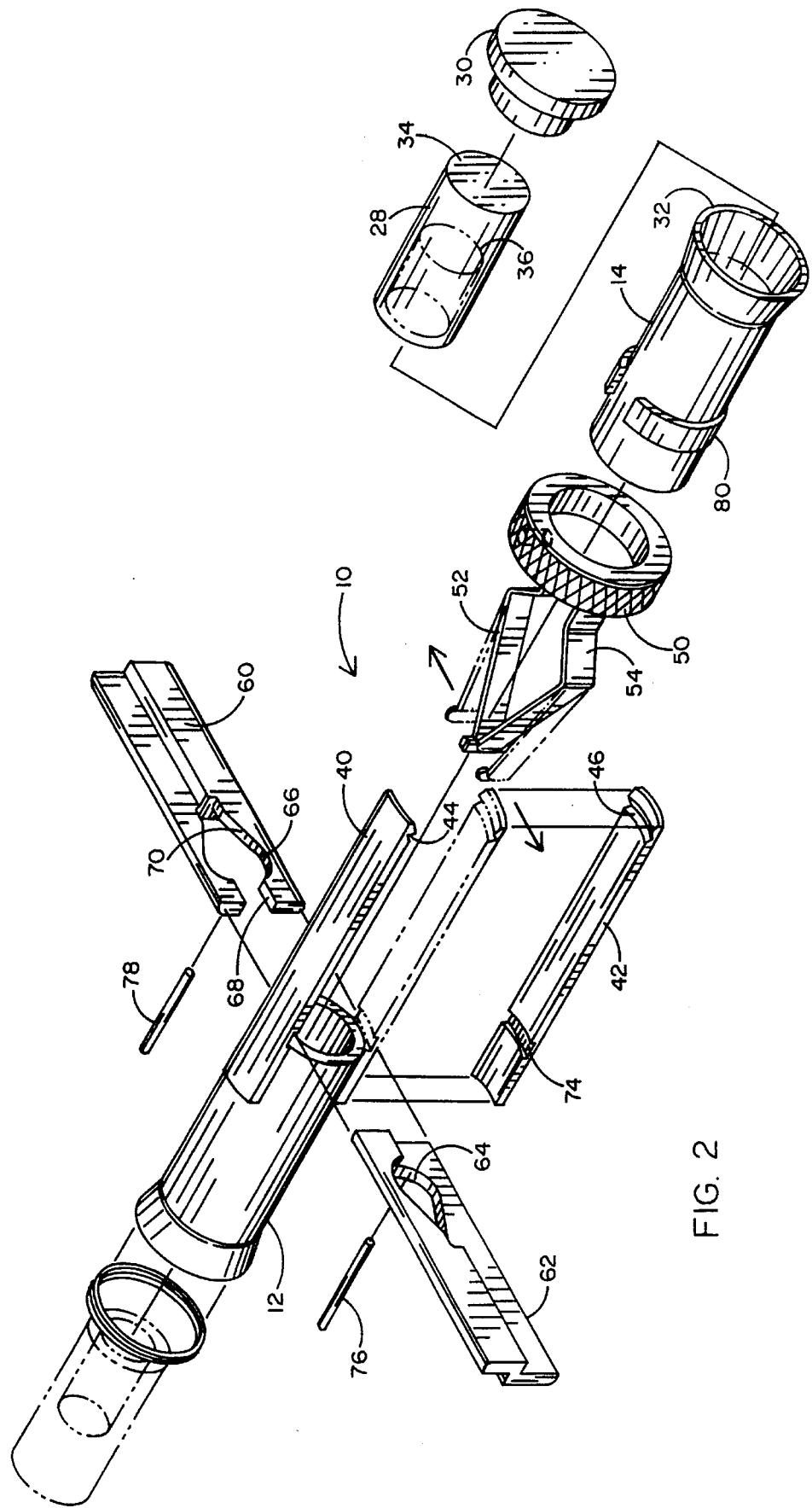
FIG. 2 is an exploded isometric view thereof.

Clamp tube 14 is similar, with a bore 24 therethrough and with a shoulder 26 therein. FIG. 6 shows plug 28 inserted against shoulder 26. Rubber plug 30 engages into the funnel 32 of the clamp tube to hold the plug 28 in place. It is understood that the plug 28 can go into either the body tube or the clamp tube, with the rubber plug 30 holding it in place, depending upon needs. In the present description, the plugs 28 and 30 are described as going into the clamp tube 14. In addition, it should be noted that the right end 34 of plug 28, as seen in FIG. 2, is flat. The left end has a bore 36 therein, which has a flat or shaped bottom. The bore 36 in plug 28 is just slightly larger than the bore 24 so that, when hair or fibers are introduced through the body tube 12 from right to left in FIG. 6, the fibers do not hang up on the face of the plug. Instead, they strike the bottom of the bore in plug 28 so that the ends thereof are evened up. The flat or shaped bottom of the bore 36 is positioned to define the distance from the clamp jaws. The bottom may be positioned at different locations in different interchangeable plugs. Furthermore, the shape of the bottom of the bore 36 is selected for the purpose desired.

Figure 3A:
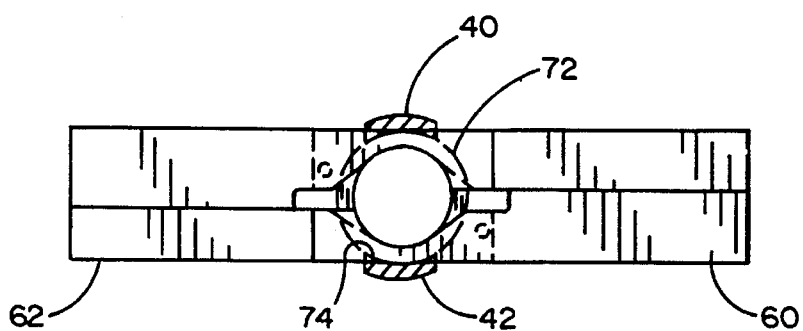
FIG. 3A is a section taken generally along line 3A—3A of FIG. 3, showing the gathering slides in the open position.
Figure 4A:
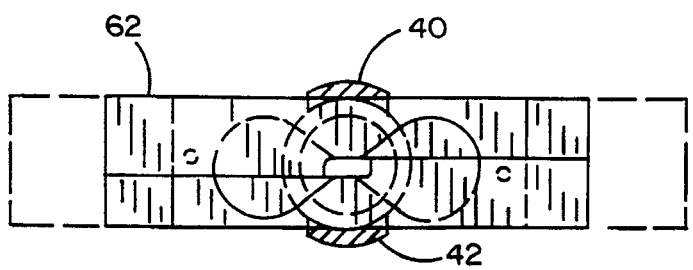
FIG. 4A is a section taken generally along line 4A—4A of FIG. 4, showing the gathering slides in the gathering position.

Guides 40 and 42 are longitudinal sections of a cylindrical tubular shell which has an interior diameter the same as the exterior diameter of the body tube and the clamp tube. Both guides are seen in FIGS. 2, 3A and 4A, with the guide 40 shown on the top in the other figures. These guides permit the clamp tube to slide toward the body tube. The guides are secured to the body tube so that they extend out as fingers between which the clamp tube can be entered. Detente notches 44 and 46, see FIG. 2, are formed inside the ends of these guides. They grasp on detente ring 48, which is formed as part of collar 50, see FIG. 6. In this position, a body tube and clamp tube lie close to contact with the gathering slides 60 and 62.

Clamp jaws 52 and 54 are of spring metal and are attached to collar 50. The clamp jaws have jaw pads 56 and 58 thereon. The clamp jaws are configured so that, when released, the clamp jaws bring these jaw pads together, as seen in FIG. 5. Therefore, the clamp jaws and clamp pads are within the confines of the tool, where the tool includes the body tube, the clamp tube, and the guides.

Figure 1:
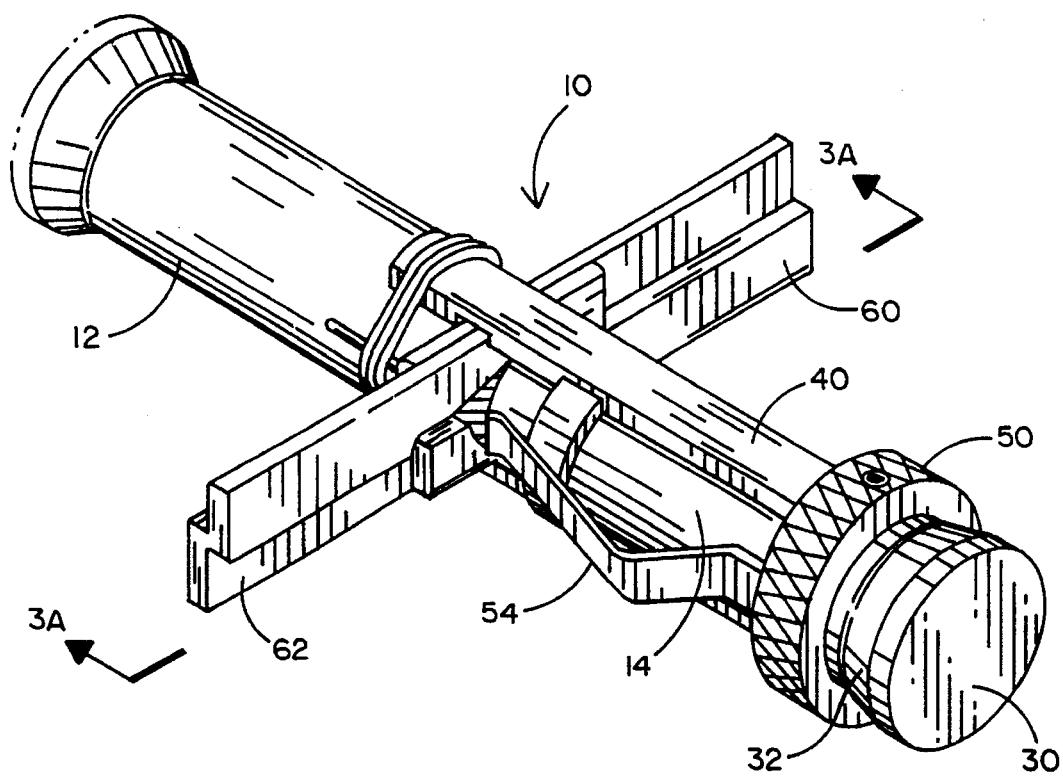
FIG. 1 is an isometric view of the fly tier's stack and clamp tool of this invention.

Gathering slides 60 and 62 are best seen in FIGS. 1 and 2, and their operation is seen in FIGS. 3, 3A, 4 and 4A. The gathering slides are formed as a pair of Z-shaped members, with equal offsets. They are arranged so that, when the center is cut out, they can slide with respect to each other in overlapping relationship. In FIG. 2, it is seen that circular openings 64 and 66 are formed in the slides 62 and 60. These openings have open ends, with notch 68 forming the open end of slide 60 in FIG. 2. Opposite the open end, the circular opening is tapered down into a V-notch 70. Both of the gathering slides are configured in this manner. They fit in notches 72 and 74 in the guides 40 and 42 so that the gathering slides may slide with respect to each other. When the gathering slides are in the open position shown in FIGS. 1, 3 and 3A, the circular openings 64 and 66 line up so that they are the same size as the bores in tubes 12 and 14. Pins 76 and 78 are placed in the gathering slides, respectively, so that the gathering slides may be held manually in an open position against the tension of rubber band 79 around the pins, yet are movable with rubber band tension to the closed position shown in FIGS. 4 and 4A.

The first use position is shown in FIGS. 1, 3, 3A and 6. The clamp tube is assembled onto the body tube, and the gathering slides are in the open position. The hair end positioning plug 28 and rubber plug 30 are in the end of the clamp tube. The tool 10 is oriented with the clamp tube down and the body tube up. The hair, fibers, or other materials which are to be stacked and clamped are placed tip end down through the funnel 20. The tool 10 can be tapped several times to bring the lower ends of all the fibers evenly against the plug 28. These fibers are spread out through the bore 24 and, before clamping, must be bunched.

Figure 3:
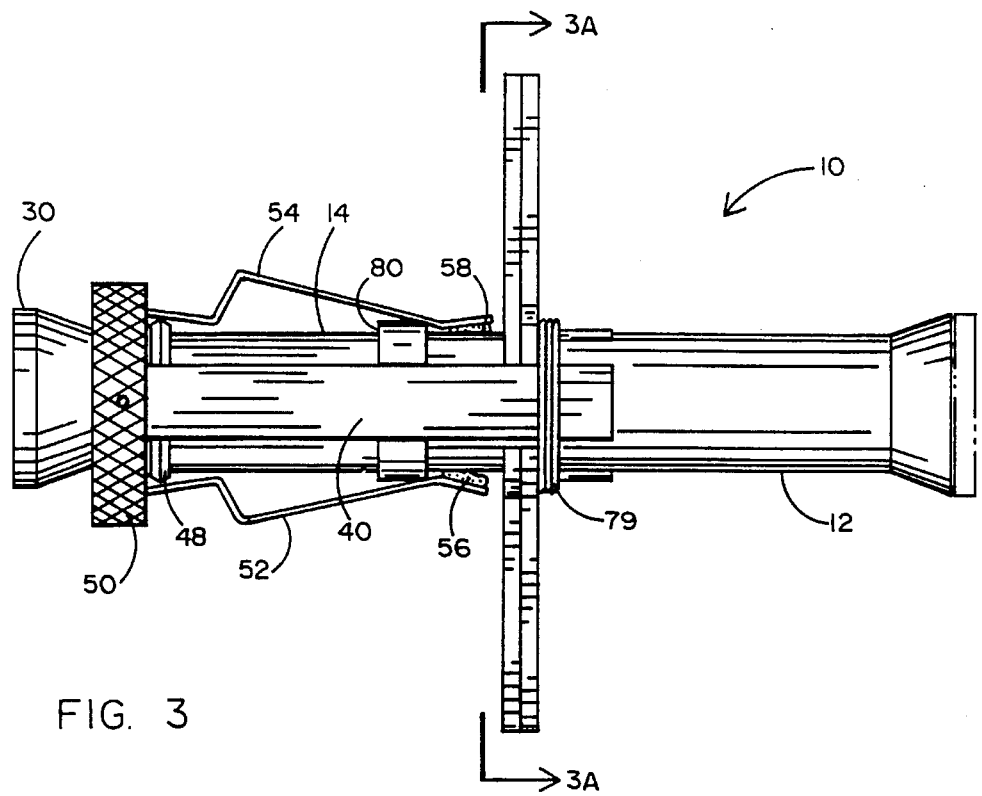
FIG. 3 is a side-elevational view thereof in the closed position.

The gathering slides 60 and 62 are pressed toward each other from the open position of FIGS. 3 and 3A to the bunching position or gathering position of FIGS. 4 and 4A. The motion of the slides with respect to each other reduces the net size of the opening through the gathering slides, as seen in FIG. 4A. The hair is held in this position. Next, the clamp tube 14 is pulled away to the left, as seen in FIG. 4. After the hairs are bunched, tool orientation does not matter and the tool may be moved around in order to best accomplish its manual manipulation. In FIG. 3, it is noted that the clamp jaws are held open by the clamp tube 14. When the clamp tube is pulled to the left, as seen in FIG. 4, the clamp jaws are released and move inwardly to clamp onto the bunched hair. The collar 50 and its clamp jaws remain in the same position with respect to the body tube because the guides 40 and 42 have their detente notches engaged on the detente ring 48 during this portion of the operation. Stop ring 80 is formed as two ring segments which are secured to the outside of the clamp tube 14 adjacent its forward end. These stop ring segments prevent the collar 50 from sliding off the small end of the clamp tube.

Once clamped, the gathering slides are released from the hair because the hair is held by the clamp jaws. Once the clamping is completed by the pulling of the clamp tube 14 to the position of FIG. 4, then the clamp tube with collar 50 and its clamp jaws can be pulled away from the detente notches 44 and 46 to the position shown in FIG. 5. In this position, the hairs are clamped between the jaws, but are free of other encumbrances. The evened-up tips are to the left, as seen in FIG. 5. It is from this position that the clamp tube is taken to the fly tier's vise where the clamped material may be attached to a hook held in the vise by means of upwardly-wound thread. In this way, hairs and other fibers can be stacked with one end even, clamped and held in that position, and moved to a tieing position. It is to be noted that the evened-up ends are short and inside the clamp from being squared-up on the plug 28.

The plug has an interior bore 36 which determines the position of the ends of the hair or other fiber. As seen in FIG. 6, the distance to the bottom of the bore 36 determines how much of the hair extends beyond the clamps. Plugs of different sorts with different depths of bore 36 are useful. Also, different shapes in the bottom of the bore may be useful. Such shapes might include conical and/or hemispherical shapes. Such would bring out ends which were shaped in accordance with the bottom of the ends when configured in this manner. When the plug 28 and rubber plug 32 are placed into the body tube 12, then the body tube is in the downward position during stacking. When hair or other fiber is inserted, tips down into the clamp tube, tapping of the clamp tool with the rubber plug down evens up the fibers against the plug. Gathering is accomplished by moving the gathering slides together, and clamping is accomplished by pulling the clamp tube. In this circumstance, the evened ends of the fibers are at a considerable distance away from the clamp jaws and are pointing away from the clamp tube. This permits the use of evened ends away from the clamp tube when tieing, if desired. The fly tier's stack and clamp tool 10 thus accomplishes the desired functions quickly and easily.

The open ends of the body tube and clamp tube are the same. Thus, the plug 28 can go into either end. In FIG. 2, it is illustrated in dashed lines in its alternative position of being inserted into the body tube. When it is inserted therein up to the shoulder therein, rubber plug 30 is also inserted to hold it in place. The tool 10 operates in the same manner, except that the hair is inserted into the clamp tube end, and tapping the hair into position is done with the body tube 12 downward. Thus, with different plugs as well as use of the plugs in either end of the tool 10, clamping at different positions along the length of the stacked hair or fiber can be achieved.

This invention has been described in its presently contemplated best embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A fly tier's tool comprising:

a tube to receive fly tiers' fibrous material having ends, a stop surface within said tube to position the ends of said fibrous material;

means within said tube for gathering the fibrous material within said tube for bunching the fibrous material within said tube; and means within said tool for clamping the fibrous material and holding the fibrous material in gathered and stacked position while the fiberous material is removed from said tube.

2. The fly tier's tool of claim 1 wherein said tube is a body tube and said tube is open therethrough, and further including a plug within said body tube for defining said stop surface against which the fibrous material is stacked so that changing said plug can change the length of fibrous material within said body tube.

3. The fly tier's tool of claim 2 wherein in addition to said body tube there is also a clamp tube, said means for clamping being mounted on said clamp tube, said plug being selectively insertable into either said body tube or said clamp tube.

4. The fly tier's tool of claim 2 wherein said surface on said plug is of predetermined shape so that when fibrous material is stacked against said surface, the alignment of the fibrous material is organized in accordance with the shape of said surface.

5. The fly tier's tool of claim 3 wherein first and second gathering slides are positioned between said body tube and said clamp tube, said gathering slides being movable with respect to each other to gather fibers therebetween for subsequent clamping.

6. The fly tier's tool of claim 1 wherein said tube is a body tube and in addition there is a clamp tube, said means for clamping comprising a pair of clamp jaws mounted on said clamp tube.

7. The fly tier's tool of claim 6 wherein both said body tube and clamp tube have openings therein, said openings being aligned so that fibers can extend through one of said tubes and into the other of said tubes, guides inter-engaging said tubes so that said tubes can be slid together and away from each other in substantial tubular alignment.

8. The fly tier's tool of claim 7 wherein first and second gathering slides are positioned between said body tube and said clamp tube, said gathering slides being movable with respect to each other to gather fibers therebetween for subsequent clamping.

9. A fly tier's tool comprising:

a body tube and a clamp tube, said body tube and said clamp tube each having an opening therethrough, guides inter-engaging between said body tube and said clamp tube so that said tubes can move toward and away from each other in substantial alignment, a plug for fitting into one of said tubes to define a surface against which fibers can be aligned;

first and second gathering slides, said gathering slides each having an opening therethrough, said openings being configured so that when said slides move with respect to each other the opening size is decreased; and means for clamping fibrous material after it has been stacked against said plug surface and has been gathered by said gathering slides.

10. The fly tier's tool of claim 9 wherein said means for clamping fibrous material comprises conforming clamp jaws having resilient surfaces for conforming around bunched fibrous material and clamping thereon.

11. The fly tier's tool of claim 9 wherein each of said first and second gathering slides has an opening therethrough at least equal in size to the opening through said body tube and clamp tube and said openings are in alignment with each other when said gathering slides are in an open position so that fibers are unobstructed thereby when said gathering slides are in their open position, said opening through said gathering slides being narrow on one side of said opening so that relative motion of said gathering slides reduces the size of the opening through both said gathering slides to gather fibers.

12. The fly tier's tool of claim 9 wherein said plug is removable and is selectably positioned in either said body tube or said clamp tube, a rubber bumper associated with said plug so that said fly tier's tool can be tapped on said rubber bumper to urge the fibrous material to engage against said plug for desired alignment.

13. The fly tier's tool of claim 9 wherein a collar is slidably mounted on said clamp tube and said means for clamping comprises first and second clamp jaws mounted on said collar, said first and second clamp jaws being resilient and being configured to come together for clamping fibers when unobstructed, said collar being slidable along said clamp tube so that said clamp tube can be removed while said collar remains stationary with respect to said body tube so that said clamp jaws are permitted to clamp fibers.

14. The fly tier's tool of claim 13 wherein said tubes are guided with respect to each other by means of guides secured to said body tube, said guides being releasably detented to said collar to hold said collar in position with respect to said body tube when said clamp tube is withdrawn.

15. The fly tier's tool of claim 13 further including a stop on said clamp tube, said stop being positioned to limit motion of said collar along said clamp tube.

16. The fly tier's tool of claim 13 wherein said tubes are guided with respect to each other by means of guides on said body tube, said guides being releasably detented to said collar to hold said collar in position with respect to said body tube when said clamp tube is withdrawn.

17. The fly tier's tool of claim 16 wherein said gathering slides are positioned to slide in notches in said guides, said gathering slides being movable generally transverse to said openings in said body tube and said clamp tube.

18. A fly tier's tool comprising:

a body tube and a clamp tube, a guide interengaging said body tube and clamp tube so that said tubes can be moved into and out of substantially axial position;

a plug for placing in one of said tubes to define a surface against which fibers can be stacked;

gathering slides slidably mounted with respect to said body tube so that once stacked, fibers can be gathered;

a collar movably mounted on said clamp tube, clamp jaws on said collar, said clamp tube holding said jaws away from stacked fibers when said clamp tube is adjacent said body tube and said clamp tube releasing said clamp jaws as said clamp tube is moved away from said body tube so that said jaws clamp gathered fibers.

19. The fly tier's tool of claim 18 wherein said guide means between said body tube and said clamp tube is detachably engaged to said collar so as to retain said collar with respect to said body tube when said clamp tube is moved to permit clamping of the fiber.

20. The fly tier's tool of claim 19 wherein said gathering slides are Z-shaped slides which slide against each other from a position wherein they have aligned openings to a position wherein they have smaller aligned openings.

21. The fly tier's tool of claim 18 further including resilient means between said gathering slides to resiliently urge said gathering slides against manual actuation.

* * * * *